(12) United States Patent
Uehara

(10) Patent No.: US 12,332,843 B2
(45) Date of Patent: Jun. 17, 2025

(54) DATA MANAGEMENT APPARATUS, DATA MANAGEMENT METHOD, AND COMPUTER PROGRAM

(71) Applicant: Hitachi, Ltd., Tokyo (JP)

(72) Inventor: Yasuhiro Uehara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/584,071

(22) Filed: Feb. 22, 2024

(65) Prior Publication Data

US 2024/0385992 A1 Nov. 21, 2024

(30) Foreign Application Priority Data

May 16, 2023 (JP) ................................ 2023-080989

(51) Int. Cl.
*G06F 16/16* (2019.01)
*G06F 16/11* (2019.01)

(52) U.S. Cl.
CPC .......... *G06F 16/162* (2019.01); *G06F 16/122* (2019.01)

(58) Field of Classification Search
CPC .............................. G06F 16/162; G06F 16/122
See application file for complete search history.

(56) References Cited

U.S. PATENT DOCUMENTS

| | | | | |
|---|---|---|---|---|
| 2014/0082717 A1* | 3/2014 | Kang | ...................... | G06F 21/34 726/9 |
| 2023/0084198 A1* | 3/2023 | Shu | ......................... | G06F 9/451 726/26 |
| 2024/0354217 A1* | 10/2024 | Lo | ............................ | G06F 9/48 |

FOREIGN PATENT DOCUMENTS

| | | |
|---|---|---|
| JP | 2004-102809 A | 4/2004 |
| JP | 2006-127365 A | 5/2006 |
| JP | 2008-077580 A | 4/2008 |

OTHER PUBLICATIONS

Japanese Office Action issued in corresponding JP Application No. 2023-080989, dated Oct. 1, 2024 with Machine translation (6 pages).

\* cited by examiner

*Primary Examiner* — Cam Y T Truong
(74) *Attorney, Agent, or Firm* — Foley & Lardner LLP

(57) ABSTRACT

A data management apparatus selects a trail from management data. The management data includes, for an operation item regarding a system to be operated, data representing a workflow representing one or a plurality of works constituting a business of a system operation and associated with the operation item, and data representing a regulation matter associated with the operation item for a standard or a law. A trail is associated with the workflow. The data management apparatus performs deletion determination that is determination as to whether or not the selected trail can be deleted. The deletion determination includes a determination as to whether or not the current date and time exceeds the holding expiration time of the selected trail. The holding expiration time of the selected trail is an expiration time determined from the generation date and time of the trail and the holding period represented by the regulation matter associated with the operation item corresponding to the workflow with which the trail is associated. When a result of the deletion determination is true, the data management apparatus deletes the selected trail.

7 Claims, 8 Drawing Sheets

| BUSINESS NAME | WORK NAME |
|---|---|
| RETURN PROCEDURE OF VIRTUAL MACHINE | APPLICATION |
| | RETURN WORK |
| | COMPLETE/APPROVAL CONTACT |

163E2

| BUSINESS NAME | WORK NAME |
|---|---|
| LEND PROCEDURE OF VIRTUAL MACHINE | APPLICATION |
| | CONFIRMATION OF APPLICATION CONTENT |
| | LAUNCH OF VIRTUAL MACHINE |
| | CONFIRMATION OF LAUNCHING OF VIRTUAL MACHINE |
| | COMPLETE/APPROVAL CONTACT |

163E3

| BUSINESS NAME | WORK NAME |
|---|---|
| LEND PROCEDURE OF VIRTUAL MACHINE | APPLICATION |
| | CONFIRMATION OF APPLICATION CONTENT |
| | LAUNCH OF VIRTUAL MACHINE |
| | ASSIGNMENT OF STAFF |
| | CONFIRMATION OF LAUNCHING OF VIRTUAL MACHINE |
| | COMPLETE/APPROVAL CONTACT |

163E4

| BUSINESS NAME | WORK NAME |
|---|---|
| LEND PROCEDURE OF VIRTUAL MACHINE | ASSIGNMENT OF STAFF |
| | CONFIRMATION OF LAUNCHING OF VIRTUAL MACHINE |
| | COMPLETE/APPROVAL CONTACT |

| BUSINESS NAME | WORK NAME |
|---|---|
| LEND PROCEDURE OF VIRTUAL MACHINE | APPLICATION |
| | CONFIRMATION OF APPLICATION CONTENT |
| | LAUNCH OF VIRTUAL MACHINE |
| | CONFIRMATION OF LAUNCHING OF VIRTUAL MACHINE |
| | COMPLETE/APPROVAL CONTACT |

167E

| WORK STAFF | START DATE AND TIME | END DATE AND TIME | EXECUTION LOG | STATUS | ... |
|---|---|---|---|---|---|
| APPLICANT | 2023/01/04 10:00 | 2023/01/04 10:05 | | | |
| OPERATION STAFF | 2023/01/04 11:00 | 2023/01/04 11:10 | | | |
| (COMMAND OR SCRIPT) | 2023/01/04 11:05 | 2023/01/05 10:00 | | | |
| OPERATION STAFF | 2023/01/05 10:05 | 2023/01/05 12:00 | LOG A | | |
| OPERATION MANAGER | 2023/01/05 14:00 | 2023/01/04 4:30 | LOG A | COMPLETE | |

FIG. 5

| OPERATION ITEM | STANDARD/LAW | | | |
|---|---|---|---|---|
| | STANDARD A | STANDARD B | LAW A | STANDARD C | STANDARD D |
| INCIDENT MANAGEMENT | CORRESPONDING PORTION: 1.1.1.a TRAIL HOLDING PERIOD: ONE YEAR | | | | |
| PASSWORD CHANGE | | CORRESPONDING PORTION: 2.2.2.b TRAIL HOLDING PERIOD: NONE | | CORRESPONDING PORTION: 1.1.1.b TRAIL HOLDING PERIOD: THREE WEEKS | CORRESPONDING PORTION: 3.3.1 TRAIL HOLDING PERIOD: ONE MONTH |
| NORMAL MAINTENANCE | CORRESPONDING PORTION: 3.3.4 TRAIL HOLDING PERIOD: ONE MONTH | | | | |
| SERVICE MONITORING | CORRESPONDING PORTION: 3.3.5 TRAIL HOLDING PERIOD: NONE | | | | |

| OPERATION ITEM | STANDARD/LAW ||
| --- | --- | --- |
|  | STANDARD A | STANDARD D |
| INCIDENT MANAGEMENT | CORRESPONDING PORTION: 1.1.1.a TRAIL HOLDING PERIOD: ONE YEAR |  |
| PASSWORD CHANGE |  | CORRESPONDING PORTION: 3.3.1 TRAIL HOLDING PERIOD: ONE MONTH |
| NORMAL MAINTENANCE | CORRESPONDING PORTION: 3.3.4 TRAIL HOLDING PERIOD: ONE MONTH |  |
| SERVICE MONITORING | CORRESPONDING PORTION: 3.3.5 TRAIL HOLDING PERIOD: NONE |  |

DATA MANAGEMENT APPARATUS, DATA MANAGEMENT METHOD, AND COMPUTER PROGRAM

BACKGROUND OF THE INVENTION

1. Field of the Invention

The present invention relates generally to data management.

2. Description of the Related Art

Increase in data to be stored compresses the storage capacity. A technique for deleting data whose storage period has elapsed is generally known (e.g., JP 2004-102809 A).

SUMMARY OF THE INVENTION

Every time a workflow, which is a series of works, is executed in the operation of the system, a "trail" is accumulated as data indicating a work trace of the workflow.

A trail generally has a storage period based on a standard or law, and deleting a trail entails a risk of violating the standard or law. Therefore, it is easy to take a measure to keep the trail without deleting the trail as an operation.

However, when a large amount of trails are accumulated as data to be stored, consumption of storage capacity increases. In addition, some companies adopt an operation of migrating on-premises data to a cloud service, but if a large amount of trails are accumulated, consumption of storage capacity on the cloud service increases, and an increase in service usage fee becomes a concern.

Therefore, it is conceivable to apply the technology disclosed in JP 2004-102809 A to a trail.

However, there is no known technology for managing trails to easily specify which trails have holding periods based on which standards and laws.

Therefore, if automatic file deletion is simply applied to a trail, there is a possibility that a trail that is preferably not deleted or should not be deleted will be deleted.

The data management apparatus selects any trail when one or more trails are included in the management data. The management data is data including, for each of a plurality of operation items regarding a system to be operated, data representing a workflow representing one or a plurality of works constituting a business of system operation and associated with the operation item, and data representing a regulation matter associated with the operation item for a standard or a law. Every time the execution of the workflow is started, a trail that is data representing a trace of the workflow is associated with the workflow. The data management apparatus performs deletion determination that is determination as to whether or not the selected trail can be deleted. The deletion determination includes a determination as to whether or not the current date and time exceeds the holding expiration time of the selected trail. The holding expiration time of the selected trail is an expiration time determined from the generation date and time of the trail and the holding period represented by the regulation matter associated with the operation item corresponding to the workflow with which the trail is associated. When a result of the deletion determination is true, the data management apparatus deletes the selected trail.

According to the present invention, automatic deletion of trails can be enabled.

BRIEF DESCRIPTION OF THE DRAWINGS

FIG. 3 illustrates some examples of workflow entries;

FIG. 4 illustrates an example of a relationship between a workflow entry and a trail entry;

FIG. 5 illustrates an example of a relationship between an operation item and a standard/law (regulation matter);

DESCRIPTION OF THE PREFERRED EMBODIMENTS

Figure 1:
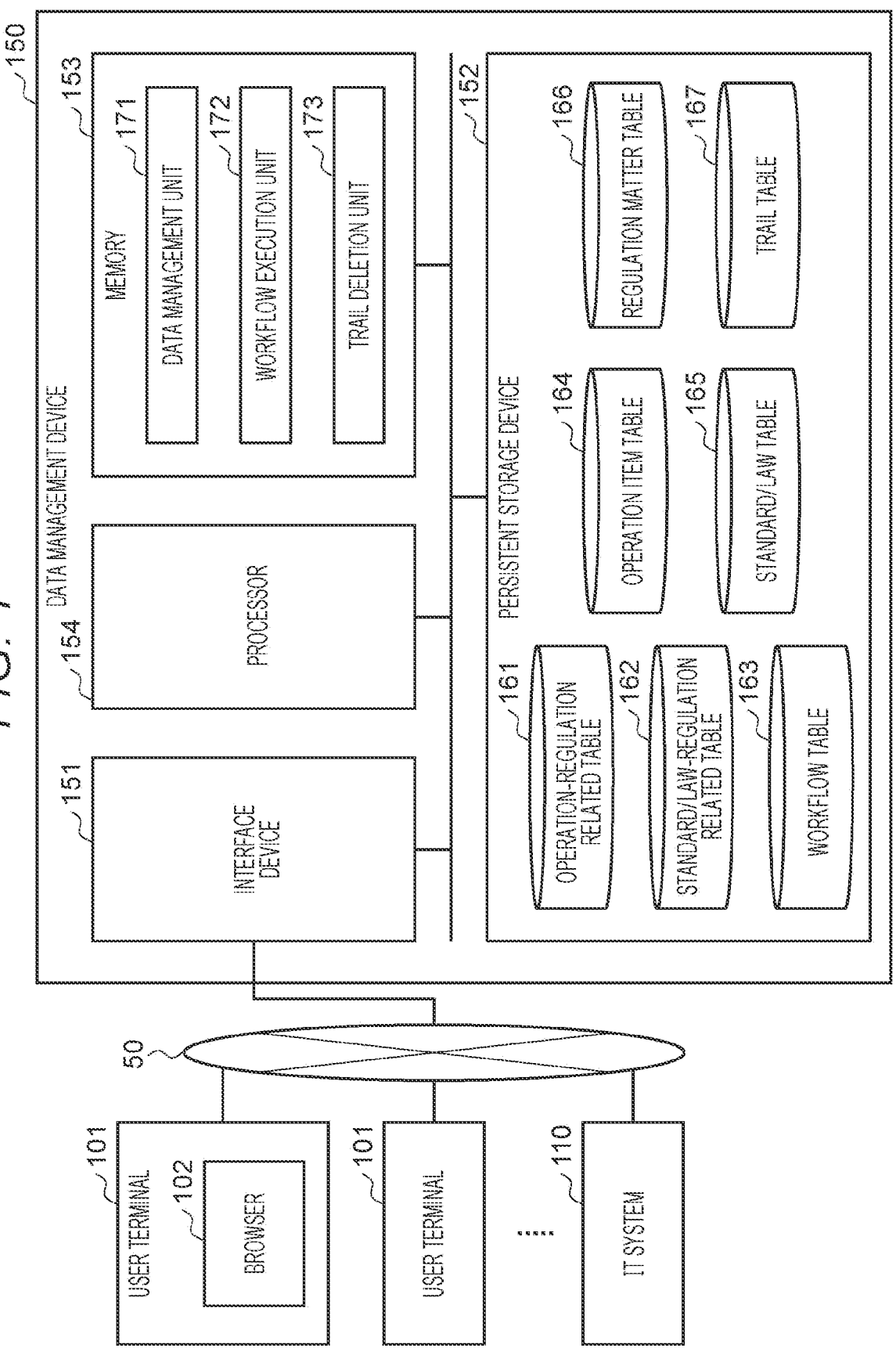
FIG. 1 illustrates a configuration example of an entire system including a data management apparatus according to a first embodiment.

In the following description, an "interface device" may be one or more interface devices. The one or more interface devices may be at least one of the following.

One or more input/output (I/O) interface devices. An input/output (I/O) interface device is an interface device for at least one of an I/O device and a remote display computer. The I/O interface device for the display computer may be a communication interface device. The at least one I/O device may be any of a user interface device, for example, an input device such as a keyboard and a pointing device, and an output device such as a display device.

One or more communication interface devices. The one or more communication interface devices may be one or more communication interface devices of the same type (e.g., one or more network interface cards (NIC)) or two or more communication interface devices of different types (e.g., an NIC and a host bus adapter (HBA)).

In the following description, a "memory" is one or more memory devices serving as an example of one or more storage devices, and may typically be a main storage device. The at least one memory device in the memory may be a volatile memory device or a nonvolatile memory device.

In addition, in the following description, a "persistent storage device" may be one or more persistent storage devices serving as an example of one or more storage devices. Typically, the persistent storage device may be a nonvolatile storage device (e.g., an auxiliary storage device), and specifically, for example, may be a hard disk drive (HDD), a solid state drive (SSD), a non-volatile memory express (NVME) drive, or a storage class memory (SCM).

In addition, in the following description, a "storage device" may be at least a memory of a memory and a persistent storage device.

Furthermore, in the following description, a "processor" may be one or more processor devices. The at least one processor device may typically be a microprocessor device such as a central processing unit (CPU), but may be another type of processor device such as a graphics processing unit (GPU). The at least one processor device may be a single core or may be a multi-core. The at least one processor device may be a processor core. The at least one processor device may be a processor device in a broad sense such as a circuit (e.g., a field-programmable gate array (FPGA), a complex programmable logic device (CPLD), or an application specific integrated circuit (ASIC)) that is an aggregate of gate arrays in a hardware description language that performs a part or all of the process.

In addition, in the following description, a function may be described using an expression "yyy unit", but the function may be realized by a processor executing one or more computer programs, may be realized by one or more hardware circuits (e.g., FPGA or ASIC), or may be realized by a combination thereof. In a case where the function is realized by the processor executing the program, the determined process is appropriately performed using the storage device and/or the interface device, and thus the function may be considered as at least a part of the processor. The process described with the function as the subject may be a process performed by a processor or a device including the processor. The program may be installed from a program source. The program source may be, for example, a program distribution computer or a computer-readable recording medium (e.g., a non-transitory recording medium). The description of each function is an example, and a plurality of functions may be integrated into one function or one function may be divided into a plurality of functions.

Some embodiments of the present invention will be described below with reference to the drawings. In the following description, "standard/law" means a standard or a law.

First Embodiment

FIG. 1 illustrates a configuration example of an entire system including a data management apparatus 150 according to a first embodiment.

The data management apparatus 150 is communicably connected to an information technology (IT) system 110 and a user terminal 101 via a communication network 50. The communication network 50 may be an arbitrary communication network such as the Internet, a wide area network (WAN), or a local area network (LAN).

The IT system 110 may be a physical computer system (a system including one or more physical computers) or a logical computer system (e.g., a system including one or more virtual computers) based on a physical computer system. The IT system 110 is a system that provides a given service, and is operated or used by a user. Note that in the present embodiment, the "user" may be, for example, one of the following. In other words, the following person can be collectively referred to as a "user".

Customer: An individual or an organization (e.g., a company) that operates the IT system 110, and uses a service provided by the data management apparatus 150. It is possible to have an end user.

Operation staff: A person who is a member of the customer and is in charge of the actual work in the operation business defined in the workflow (described later) . . . . Operation manager: A person who is a member of the customer and checks the completion of the operation business defined in the workflow or assigns an operation staff to the actual work in the operation business.

End User: An organization or an individual (typically, a customer of the customer) who uses the IT system 110 under the management of the customer, and requests (a starting point of a workflow) the customer for operation business or makes an inquiry or a claim as necessary.

Applicant: A member of the end user who applies for the first work of the operation business defined in the workflow.

The user terminal 101 is an information processing terminal (e.g., a personal computer or a smartphone) of the user, and inputs/outputs data to/from the data management apparatus 150 and the IT system 110 according to an operation by the user through, for example, a browser 102 (or a dedicated application).

The data management apparatus 150 is a physical computer system in the present embodiment, but may be a logical computer system (e.g., a virtual computer or cloud computing service) based on a physical computer system. The data management apparatus 150 includes an interface device 151, a storage device (e.g., persistent storage device 152 and memory 153), and a processor 154 connected thereto.

Communication is performed via the interface device 151. For example, the interface device 151 communicates with the user terminal 101 and the IT system 110 via the communication network 50.

The persistent storage device 152 stores data such as an operation-regulation related table 161, a standard/law-regulation related table 162, a workflow table 163, an operation item table 164, a standard/law table 165, a regulation matter table 166, and a trail table 167. Each of the tables 161 to 167 has a plurality of (or one) table entries. The table entry is, for example, a record.

The memory 153 stores one or a plurality of computer programs for realizing functions such as the data management unit 171, the workflow execution unit 172, and the trail deletion unit 173. The processor 154 executes the one or a plurality of computer programs to realize the functions 171 to 173.

The data management unit 171 has a function of selecting an operation item requiring business and starting a workflow corresponding to the selected operation item as needed, and is operated by, for example, the applicant. Furthermore, the data management unit 171 may accept a new workflow generation request from the user, generate a workflow according to the request from the user, and record data of the generated workflow in the workflow table 163.

The workflow execution unit 172 is a function of sequentially transitioning a series of works defined in the workflow, and is operated by a person who performs a system operation of a customer such as an operation staff. In addition, the workflow execution unit 172 records a work staff, a start date and time, and the like as a trail. At least some information of the trail may be manually entered by a user. Furthermore, the trail may be generated by the workflow execution unit 172 at the time when the first work of the work group defined in the workflow is started.

The trail deletion unit 173 deletes a trail periodically (or at a timing when a predetermined event occurs or the like).

The operation of the IT system 110 can be roughly classified into, for example, two types of regular business and occasional business. The "regular business" is a business that is periodically executed without human intervention (e.g., night-time backup of the system). The "occasional business" includes a business (e.g., a lending procedure of the virtual machine) that occurs as necessary and is performed manually, such as application and approval of procedures. A series of work required in the business as the system operation is a "workflow", and data indicating a work trace of the workflow is a "trail". Although the workflow may also be defined for the regular business, in the present embodiment, the workflow is defined for the occasional business.

Figure 2:
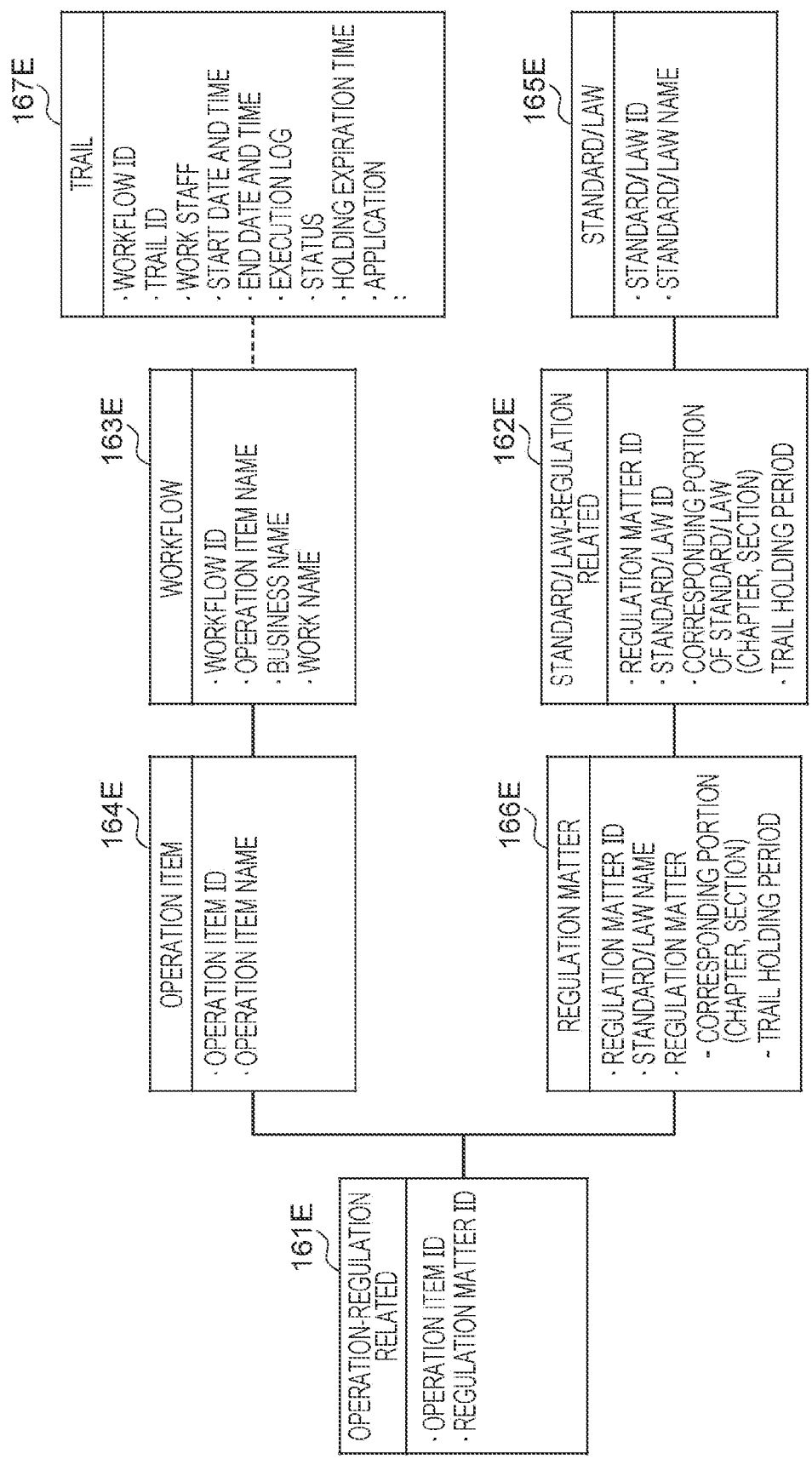
FIG. 2 illustrates a table entry relationship according to the first embodiment.

Furthermore, the IT system 110 may be an on-premises system, but may be a system in a cloud environment (e.g., a system as SaaS) in the present embodiment. Every time a workflow is executed for the IT system 110, a trail of the workflow is recorded in the trail table 167. When a large amount of trails are accumulated, the consumption of the storage capacity of the persistent storage device 152 increases. In addition, in a case where the trail table 167 is in a storage of a cloud service, an increase in service usage fee due to accumulation of a large number of trails becomes a concern. However, in the present embodiment, since automatic deletion of trails is possible, such a problem can be solved. FIG. 2 illustrates a table entry relationship according to the first embodiment.

The operation-regulation related table 161 includes an operation-regulation related entry 161E. The operation-regulation related entry 161E represents an association between an operation item and a regulation matter, for example, a set of an operation item ID and a regulation matter ID. Since the operation item entry 164E represents the operation item ID, the operation item entry 164E is associated with the operation-regulation related entry 161E through the operation item ID. Furthermore, since the regulation matter entry 166E represents the regulation matter ID, the regulation matter entry 166E is associated with the operation-regulation related entry 161E through the regulation matter ID. Note that the operation item and the regulation matter may be 1:1 or 1:many. That is, although one operation item is associated with one regulation matter, one or a plurality of regulation matters may be associated with one operation item.

The operation item table 164 includes an operation item entry 164E for each operation item. The operation item entry 164E represents information regarding the operation item, for example, an operation item ID and an operation item name. Since the workflow entry 163E represents the operation item name, the workflow entry 163E is associated with the operation item entry 164E through the operation item name. Note that the operation items and the workflow may be 1:1 or 1:many. That is, although one operation item is associated with one workflow, one or a plurality of workflows may be associated with one operation item.

The workflow table 163 includes a workflow entry 163E for each workflow. The workflow entry 163E represents information regarding the workflow, for example, a workflow ID, an operation item name, a business name (system operation name), and a work name of one or a plurality of works constituting the business corresponding to the workflow. Since the trail entry 167E represents the workflow ID, the trail entry 167E is associated with the workflow entry 163E through the workflow ID. Note that an example of the workflow entry 163E is as illustrated in FIG. 3. That is, there may be workflow entries 163E1 and 163E2 of workflows for different businesses (system operations), or there may be workflow entries 163E3 and 163E4 of workflows for the same system operation (in FIG. 3, the description of the workflow ID and the operation item name is omitted).

The trail table 167 includes a trail entry 167E for each trail. In the present embodiment, the trail entry 167E may correspond to a trail itself, but the trail entry 167E may be data associated with a trail (entity of a trail) instead of the trail itself. The trail entry 167E represents information regarding a trail, for example, a workflow ID, a trail ID, a status of business corresponding to the workflow, a holding expiration time of the trail, and an application of the trail, and represents a staff, a start date and time, an end date and time, and an execution log (alternatively, a link to the execution log) for each work constituting the business corresponding to the associated workflow. Note that an example of the relationship between the workflow entry and the trail entry is as illustrated in FIG. 4. The workflow and trail are 1:1 or 1:many. That is, each time the workflow is executed, a trail for the workflow is generated and recorded. Examples of the status of the trail include, for example, "completed" indicating that the last work of the business corresponding to the workflow has been completed, "in progress" indicating that the business corresponding to the workflow has been started but the last work has not been completed, and "interrupted" indicating that the work has stopped due to an error or the like although the business corresponding to the workflow has been started. The status may be managed for each business (system operation) or may be managed for each work constituting the business. In addition to a flow status that is a status for a workflow, an application status that is a status for an application of a trail may also be prepared as the status. That is, one or both of the flow status and the application status may be recorded in the trail entry 167E. Furthermore, as the application, the application recorded in the workflow entry 163E may be applied to the trail recorded in the workflow entry 163E and associated with the workflow entry 163E (i.e., the application may be recorded in the workflow entry 163E instead of or in addition to the trail entry 167E).

The regulation matter table 166 includes a regulation matter entry 166E for each regulation matter. The regulation matter entry 166E represents information regarding a regulation matter, for example, a regulation matter ID, a name of a standard/law having the regulation matter, a corresponding portion of the regulation matter, and a trail holding period. Since the standard/law-regulation related entry 162E represents the regulation matter ID, the standard/law related entry 162E is associated with the regulation matter entry 166E through the regulation matter ID.

The standard/law-regulation related table 162 includes a standard/law-regulation related entry 162E. The standard/law-regulation related entry 162E represents an association between a standard/law and a regulation matter, for example, a set of a regulation matter ID and a standard/law ID. In addition, the standard/law-regulation related entry 162E represents the corresponding portion of the standard/law and the authentication holding period. Since the standard/law entry 165E represents a standard/law ID, the standard/law entry 165E is associated with the standard/law-regulation related entry 162E through the standard/law ID.

The standard/law table 165 includes standard/law entry 165E for each standard/law. The standard/law entry 165E represents information regarding standard/law, for example, a standard/law ID and a standard/law name.

In the data association illustrated in FIG. 2, the association between the table entries 161E and 164E and the association among the table entries 161E, 166E, 162E, and 165E may be performed in advance, for example, by the data management unit 171. In a case where a workflow is newly generated, the workflow entry 163E of the newly generated workflow may be associated with the operation item entry 164E identified from the operation item name corresponding to the workflow by, for example, the data management unit 171. Then, the workflow execution unit 172 newly associates a trail entry 167E of a trail of the workflow with the workflow entry 163E of the workflow whose execution has started. For example, in the trail entry 167 at the start time point of the workflow, the workflow ID, the work staff of the started head work and the start date and time, and the status "in progress" may be recorded.

According to the data association illustrated in FIG. 2, the operation item is associated with the workflow, the standard/law is associated with the operation item, and as a result, it is possible to specify for which trail generated for which workflow the holding period defined in which standard/law is applied. Specifically, for example, from the data association illustrated in FIG. 2, the operation-standard/law relationship (correspondence relationship between the operation item and the standard/law (regulation matter)) illustrated in FIG. 5 is specified. This allows specification of the standard/law to be applied to the trail generated for the workflow, whereby the holding expiration time of the trail generated for the workflow is determined from the holding period of the standard/law corresponding to the operation item associated with the workflow (when there are a plurality of holding periods with different standards/laws for the same operation item, the longest holding period may be adopted).

The holding period in the regulation matter entry 166E may be a holding period specified from the standard/law having the regulation matter represented by the regulation matter entry 166E. In addition, since the holding period is recorded in the regulation matter entry 166E, the standard/law entry 165E or the standard/law-regulation related entry 162E may not have information representing the holding period. Specifically, for example, the standard/law entry 165E does not need to have information representing a corresponding portion and a holding period for each regulation matter.

Figure 6:
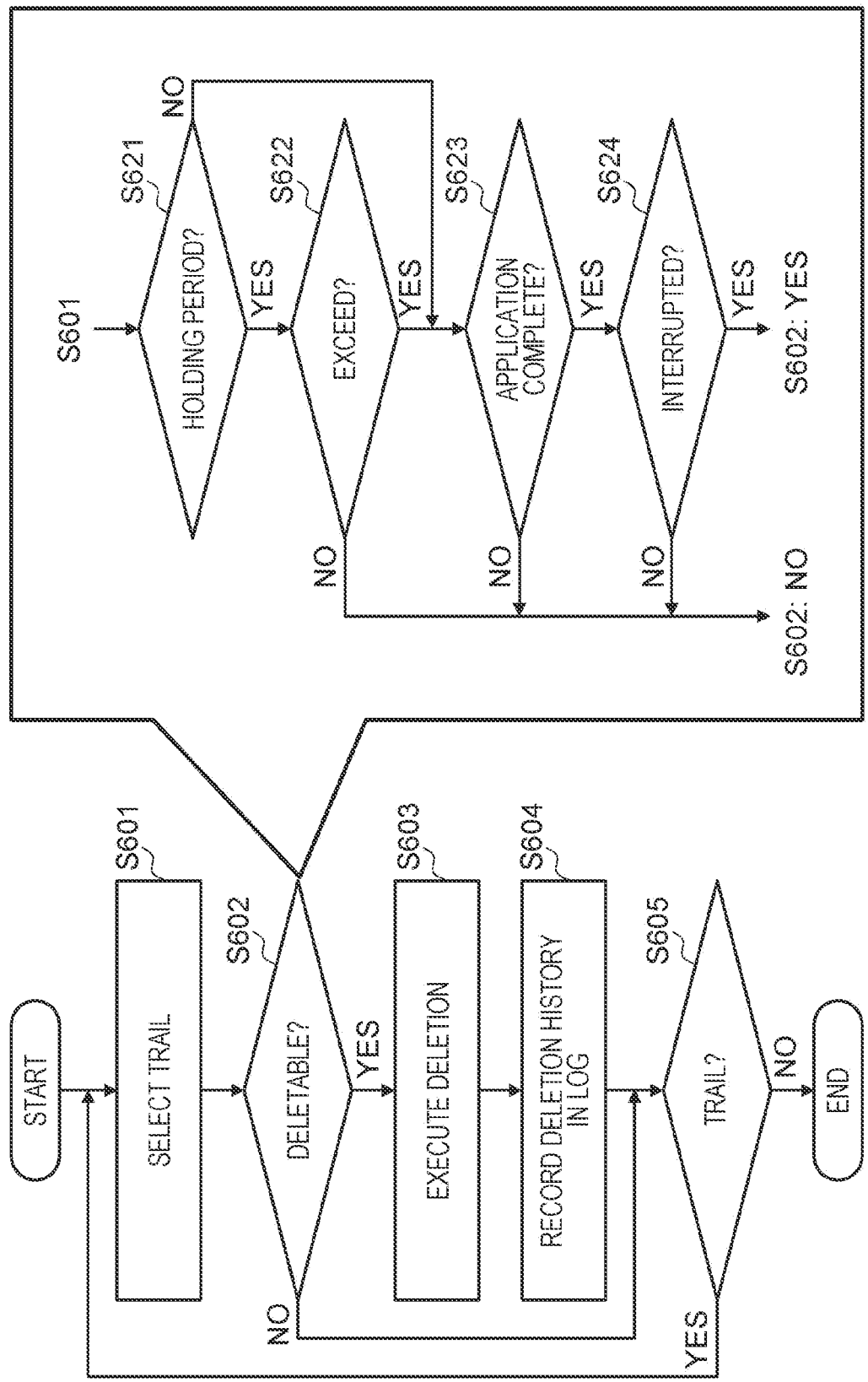
FIG. 6 illustrates a flow of a trail automatic deletion process according to the first embodiment.

FIG. 6 illustrates a flow of a trail automatic deletion process according to the first embodiment. The trail automatic deletion process is, for example, periodically started.

The trail deletion unit 173 selects a trail from one or a plurality of trails (trail entry 167E) that have not been selected in the current trail automatic deletion process (S601), and determines whether or not the trail can be deleted (S602). When the determination result in S602 is false (S602: No), the process proceeds to S605 without the trail being deleted.

When the determination result of S602 is true (S602: Yes), the trail deletion unit 173 executes deletion of the trail selected in S601 (S603). The trail deletion unit 173 records the deletion history of the trail in a log (S604). Thereafter, the process proceeds to S605.

After S602: No or S604, the trail deletion unit 173 determines whether or not there is a trail that has not been selected in the current trail automatic deletion process (S605). When the determination result in S605 is true (S605: Yes), the process returns to S601. When the determination result of S605 is false (S605: No), the current trail automatic deletion process ends.

Details of the determination in S602 are as follows.

That is, in a case where the current trail automatic deletion process is the first trail automatic deletion process for the trail selected in S601, no holding expiration time is recorded in the trail. Therefore, the trail deletion unit 173 determines whether or not there is a holding period applied to the trail by tracing the data association illustrated in FIG. 2 (e.g., tracing of trail entry 167E of the selected trail→workflow entry 163E→operation item entry 164E→operation-regulation related entry 161E→regulation matter entry 166E) (S621).

When the determination result of S621 is true (S621: Yes), the trail deletion unit 173 calculates a date and time from the generation date and time of the trail (typically, the earliest start date and time recorded in the trail (the earliest start date and time of work)) to the end of the holding period applied to the trail (the longest holding period in a case where there are a plurality of different holding periods) as a holding expiration time of the trail, records the holding expiration time in the trail, and determines whether or not the holding expiration time exceeds the current date and time (S622).

When the determination result in S621 is false (S621: No) or the determination result in S622 is true (S622: Yes), the trail deletion unit 173 determines whether or not the application defined for the trail is completed (S623). The determination in S623 may be made based on, for example, the application status of the application recorded in the trail.

When the determination result of S623 is true (S623: Yes), the trail deletion unit 173 determines whether or not the status of the trail is "interrupted" (S624).

When the determination result in S624 is true (S624: Yes), S602: Yes, that is, determination is made that the deletion of the trail is possible.

When the determination result of any one of S622, S623, and S624 is false, S602: No, that is, determination is made that that deletion of the trail is impossible.

Note that the order of determination is not limited to the order of S621, S622, S623, and S624, and any order may be adopted. Furthermore, for the same trail, the calculation of the holding expiration time in S621 and S622 may be performed for the first trail automatic deletion process and may be skipped in the second and subsequent trail automatic deletion processes. That is, the determination in S622 may be a determination as to whether or not the current date and time exceeds the holding expiration time recorded in the trail. Furthermore, the holding expiration time of the trail may be calculated when the trail is generated.

Second Embodiment

Hereinafter, a second embodiment will be described. At that time, differences from the first embodiment will be mainly described, and description of common points with the first embodiment will be omitted or simplified.

Figure 7:
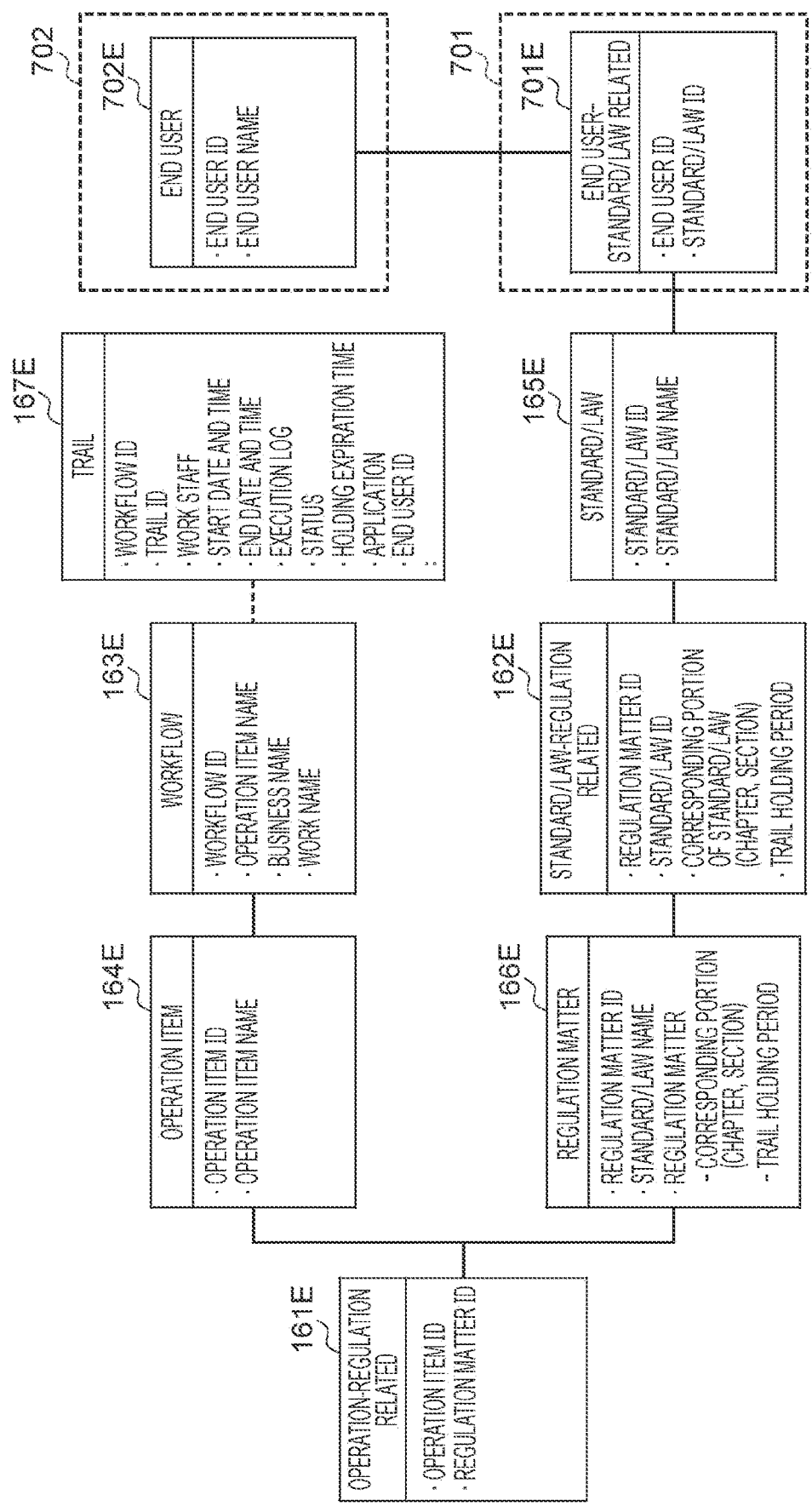
FIG. 7 illustrates a table entry relationship according to a second embodiment.

FIG. 7 illustrates a table entry relationship according to the second embodiment.

The trail entry 167E represents an end user ID. The end user ID may be managed for each business or may be managed for each work constituting the business.

An end user-standard/law table 701 and an end user table 702 are stored in the persistent storage device 152.

The end user standard/law-regulation related table 701 includes an end user standard/law related entry 701E. The end user standard/law entry 701E represents an association of an end user with a standard/law, for example, a set of an end user ID and a standard/law ID. Since the end user entry 702E represents an end user ID, the end user entry 702E is associated with the end user standard/law related entry 701E through the end user ID. Furthermore, since the standard/law entry 165E represents a standard/law ID, the standard/law entry 165E is associated with the end user standard/law related entry 701E through the standard/law ID.

The end user table 702 has an end user entry 702E for each end user. The end user entry 702E represents information regarding an end user, for example, an end user ID and an end user name.

According to the data association illustrated in FIG. 7, the holding expiration time of the trail can be managed in units of end users. For example, an operation-standard/law relationship illustrated in FIG. 5 may be specified for one end user, and an operation-standard/law relationship illustrated in FIG. 8 may be specified for another end user. That is, when there are a plurality of standards/laws (e.g., a plurality of standards/laws designated by the customer) as options selectable by the end user for each of one or more operation items, the standards/laws selected by the end user may be different for the same operation item. Therefore, even for trails generated for the same workflow, the holding expiration time varies depending on the end user.

Figures 8, 9:
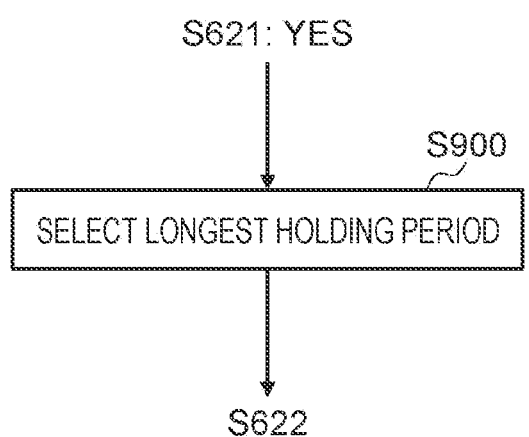
FIG. 8 illustrates an example of a relationship between an operation item and a standard/law (regulation matter) for one end user.
FIG. 9 illustrates a part of a flow of trail automatic deletion process according to the second embodiment.

Therefore, in the trail automatic deletion process according to the second embodiment, as illustrated in FIG. 9, in the case of S621: Yes, the trail deletion unit 173 selects the longest holding period among one or a plurality of holding periods corresponding to the end user of the authentication for the trail selected in S601 (S900). In S622, the trail deletion unit 173 calculates the holding expiration time of the authentication by using the selected holding period and the generation date and time of the trail, and determines whether or not the current date and time exceeds the holding expiration time.

Note that since the trail is managed in units of end users, the application of the trail may be managed for each end user in addition to the holding period. That is, the application of trails may also vary depending on the end user. Furthermore, for the same trail, the calculation of the holding expiration time in S621, S900, and S622 may be performed for the first trail automatic deletion process and may be skipped in the second and subsequent trail automatic deletion processes, or the calculation of the holding expiration time of the trail may be performed when the trail is generated.

Although some embodiments have been described above, these are examples for describing the present invention, and it is not intended to limit the scope of the present invention only to these embodiments. The present invention can be implemented in various other forms.

The above description can be summarized as follows, for example. The following summary may include the above supplementary description and description of modified examples.

A data management apparatus 150 includes a selection unit that selects any trail in a case where one or more trails are included in management data, a determination unit that performs deletion determination which is determination as to whether or not the selected trail can be deleted, and a deletion unit that executes deletion of the selected trail in a case where a result of the deletion determination is true. In the embodiments described above, the trail deletion unit 173 corresponds to an example of a selection unit, a determination unit, and a deletion unit.

The management data is data including, for each of a plurality of operation items regarding a system to be operated (e.g., the IT system 110), data a workflow representing one or a plurality of works constituting a business of system operation and associated with the operation item, and data representing a regulation matter associated with the operation item for standard/law. In the embodiments described above, the tables 161 to 167 correspond to an example of the management data.

Every time the execution of the workflow is started, a trail that is data representing a trace of the workflow is associated with the workflow. In the embodiments described above, the workflow execution unit 172 associates a trail regarding the execution of the workflow with the workflow entry 163E of the workflow every time the execution of the workflow is started.

The deletion determination includes a determination as to whether or not the current date and time exceeds the holding expiration time of the selected trail. When the result of the determination is true, the result of the deletion determination may be true. The holding expiration time of the selected trail is an expiration time determined from the generation date and time of the trail and the holding period represented by the regulation matter associated with the operation item corresponding to the workflow with which the trail is associated.

Depending on what the trail was generated for (specifically, for what kind of system operation (business) it was generated), the holding period to be applied to the trail varies. The trail is mainly used for an audit response regarding a standard/law, but management data in which the trail is associated with the standard/law through an operation item corresponding to a workflow with which the trail is associated is prepared, and a holding period applied to the trail can be specified from such management data. As a result, it is possible to automatically delete the trail so that a situation where there is no necessary trail when necessary does not occur.

The data management apparatus 150 may further include an expiration time calculation unit. The expiration time calculation unit may specify an operation item corresponding to the generated trail, specify a regulation matter corresponding to the operation item, and determine whether or not a holding period is defined in the specified regulation matter. When a result of the determination is true, the expiration time calculation unit may calculate a date and time from the generation date and time of the trail to the specified holding period as the holding expiration time of the trail. This makes it possible to specify an appropriate holding expiration time for the trail. Note that in the embodiments described above, at least one of the data management unit 171, the workflow execution unit 172, and the trail deletion unit 173 may include an example of the expiration time calculation unit.

A trail associated with an application of the trail may be associated with an application status that is a status regarding the application. The deletion determination may include a determination as to whether or not the application has been completed based on the application status of the application recorded in the selected trail. When a result of the determination is true and a result of the determination as to whether or not the current date and time has exceeded the holding expiration time of the selected trail is also true, a result of the deletion determination may be true.

There may be a case where it is not preferable to immediately delete the trail because the current date and time exceeds the trail holding expiration time. This is because trails may have different applications for different users (e.g., a customer or end user). For example, the application of the trail includes using for responding to inquiries and claims (e.g., specifying a work staff corresponding to the work to be the target of inquiry or claim), calculating a usage fee of a system to be operated (e.g., a usage fee based on the number of trails), and the like. It is possible to avoid a case where a trail that can be used for such an application is deleted because a holding expiration time has passed, and there is no trail when the trail becomes necessary for the application. Note that the application of the trail may be defined in the workflow or may be defined in a trail associated with the workflow. One or more applications may be defined in one workflow or one trail, and an application status may be associated for each application. The application status of each application may be appropriately updated based on input data (e.g., data indicating whether or not the application is necessary in the future) from the user, a result of processing by the system to be operated, and the like. The application status may be updated by, for example, an application status updating unit that updates the application status. The application status updating unit may be included in, for example, the data management unit 171.

A trail may be associated with a flow status that is a status regarding a workflow with which the trail is associated. The flow status associated with the trail may be a status representing an interruption when execution of the workflow with which the trail is associated is interrupted. The execution of the interrupted workflow is started again from the beginning, and thus a trail corresponding to the start of execution again may be newly associated with the workflow. The deletion determination may include a determination on whether or not the flow status associated with the selected trail is a status representing an interruption. As described above, in a case where the flow status of the trail is interrupted due to occurrence of a failure on the system side of the operation target that handles the workflow or for other reasons, the workflow is newly executed again and the trail is generated, and thus the trail in which the flow status is interrupted becomes a trail that wastefully consumes storage capacity. Such a trail can be detected and automatically deleted. The update of the flow status may be performed by, for example, a flow status updating unit that updates the flow status. The flow status updating unit may be included in, for example, the data management unit 171 or the workflow execution unit 172.

In the management data, a regulation matter in a standard/law may be associated with the operation item, and a standard/law having the regulation matter may be associated with the regulation matter. That is, regulation matter and the standard/law may be managed separately. As a result, it is possible to define which regulation matter in the standard/law to adopt for each customer.

The user of the system to be operated may be one or a plurality of customers and one or a plurality of end users for at least one customer. In the management data, trails may be associated with end users, and standards/laws may be associated with end users to whom regulation matters in the standards/laws are applied. In a case where there are a plurality of different holding periods represented by a plurality of different regulation matters associated with the operation item corresponding to the workflow with which the selected trail is associated and the end user associated with the selected trail, the holding expiration time of the selected trail may be an expiration time determined from the generation date and time of the trail and the longest holding period among the plurality of different holding periods. As described above, since the longest holding period is selected for the end user from the range excluding the standard/law not adopted for the end user among the standards/laws corresponding to the operation item, a holding period shorter than the longest holding period corresponding to the operation item can be selected as the longest holding period. Therefore, it is expected that the trail is deleted more appropriately and early.

What is claimed is:

1. A data management apparatus comprising:
a processor; and
at least one non-transitory computer readable medium storing one or more programs which, when executed by the processor, cause the processor to perform operations comprising:
in response to receiving a request from a device of a user:
selecting, by a selection unit, a trail from one or more trails stored in a storage device, wherein the one or more trails are included in management data, wherein the management data includes, for each operation item of a plurality of operation items regarding a system to be operated, data representing a workflow that represents one work or a plurality of works constituting a business of system operation associated with the operation item, and data representing a regulation matter associated with the operation item for a standard, wherein the selected trail that is data representing a trace of the workflow is associated with the workflow when execution of the workflow is started, wherein the selected trail is associated with a flow status regarding the workflow, wherein the flow status is a status that represents an interruption when execution of the workflow is interrupted;
performing, by a determination unit, a deletion determination to determine whether or not the selected trail is deletable, wherein the deletion determination includes a determination as to whether or not a current date and time has exceeded a holding expiration time of the selected trail and a determination as to whether or not an application has been completed based on an application status of the application recorded in the selected trail, wherein the holding expiration time of the selected trail is an expiration time determined from a generation date and time of the selected trail to end of a holding period applied to the selected trail, wherein the holding period is represented by a regulation matter associated with an operation item corresponding to the workflow;
presenting, by the determination unit, an interruption for the selected trail when execution of the workflow is interrupted, wherein the selected trail corresponding to a beginning of execution is newly associated with the workflow when the execution of the interrupted workflow is started from the beginning;
automatically executing, by a deletion unit, deletion of the selected trail by deleting the selected trail when a result of the performed deletion determination is true; and
recording, by the deletion unit, based on the execution of deletion of the selected trail, a deletion history of the selected trail in a log of a storage device and updating the status of the application in the selected trail.

2. The data management apparatus according to claim 1, further comprising an expiration time calculation unit, wherein the expiration time calculation unit includes:
specifying an operation item corresponding to a generated trail;
specifying a regulation matter corresponding to the operation item;
determining whether or not a holding period is defined for the specified regulation matter; and
calculating a date and time from a generation date and time of the trail to the determined holding period as a holding expiration time of the trail when a result of the deletion determination is true.

3. The data management apparatus according to claim 1, wherein a trail associated with an application of the trail is associated with an application status that is a status regarding the application.

4. The data management apparatus according to claim 1, wherein in the management data, a regulation matter in a standard/law is associated with the operation item, and a standard or a law having the regulation matter is associated with the regulation matter.

5. The data management apparatus according to claim 1, wherein a user of the system is one customer, a plurality of customers or a plurality of end users for at least one customer, and in the management data, an end user is associated with a trail, a regulation matter in a standard or a law is applied to an end user, and wherein a plurality of different holding periods are represented by a plurality of different regulation matters associated with the operation item corresponding to the workflow associated with the selected trail and the end user associated with the selected trail, wherein the holding expiration time of the selected trail is an expiration time determined from a generation date and time of the trail and a longest holding period among the plurality of different holding periods.

6. A data management method comprising:

in response to receiving a request from a device of a user:

selecting, by a selection unit of a computer system, a trail from one or more trails stored in a storage device, wherein the one or more trails are included in management data, wherein the management data includes, for each operation item of a plurality of operation items regarding a system to be operated, data representing a workflow that represents one work or a plurality of works constituting a business of system operation associated with the operation item, and data representing a regulation matter associated with the operation item for a standard, wherein the selected trail that is data representing a trace of the workflow is associated with the workflow when execution of the workflow is started, wherein the selected trail is associated with a flow status regarding the workflow, wherein the flow status is a status that represents an interruption when execution of the workflow is interrupted;

performing, by a determination unit of the computer system, a deletion determination to determine whether or not the selected trail is deletable, wherein the deletion determination includes a determination as to whether or not a current date and time has exceeded a holding expiration time of the selected trail and a determination as to whether or not an application has been completed based on an application status of the application recorded in the selected trail, wherein the holding expiration time of the selected trail is an expiration time determined from a generation date and time of the selected trail to end of a holding period applied to the selected trail, wherein the holding period is represented by a regulation matter associated with an operation item corresponding to the workflow;

presenting, by the determination unit, an interruption for the selected trail when execution of the workflow is interrupted, wherein the selected trail corresponding to a beginning of execution is newly associated with the workflow when the execution of the interrupted workflow is started from the beginning;

automatically executing, by a deletion unit of the computer system, deletion of the selected trail by deleting the selected trail when a result of the performed deletion determination is true; and recording, by the deletion unit, based on the execution of deletion of the selected trail, a deletion history of the selected trail in a log of a storage device and updating the status of the application in the selected trail.

7. A computer program stored in a non-transitory computer readable media for causing a computer system to execute operations comprising:

in response to receiving a request from a device of a user:

selecting, by a selection unit of the computer system, a trail from one or more trails stored in a storage device, wherein the one or more trails are included in management data, wherein the management data includes, for each operation item of a plurality of operation items regarding a system to be operated, data representing a workflow that represents one work or a plurality of works constituting a business of system operation associated with the operation item, and data representing a regulation matter associated with the operation item for a standard, wherein the selected trail that is data representing a trace of the workflow is associated with the workflow when execution of the workflow is started, wherein the selected trail is associated with a flow status regarding the workflow, wherein the flow status is a status that represents an interruption when execution of the workflow is interrupted;

performing, by a determination unit of the computer system, a deletion determination to determine whether or not the selected trail is deletable, wherein the deletion determination includes a determination as to whether or not a current date and time has exceeded a holding expiration time of the selected trail and a determination as to whether or not an application has been completed based on an application status of the application recorded in the selected trail, wherein the holding expiration time of the selected trail is an expiration time determined from a generation date and time of the selected trail to end of a holding period applied to the selected trail, wherein the holding period is represented by a regulation matter associated with an operation item corresponding to the workflow;

presenting, by the determination unit, an interruption for the selected trail when execution of the workflow is interrupted, wherein the selected trail corresponding to a beginning of execution is newly associated with the workflow when the execution of the interrupted workflow is started from the beginning;

automatically executing, by a deletion unit of the computer system, deletion of the selected trail by deleting the selected trail when a result of the performed deletion determination is true; and recording, by the deletion unit, based on the execution of deletion of the selected trail, a deletion history of the selected trail in a log of a storage device and updating the status of the application in the selected trail.

* * * * *